United States Patent
Bhaduri et al.

(10) Patent No.: US 12,177,017 B2
(45) Date of Patent: Dec. 24, 2024

(54) METHODS, SYSTEMS, AND COMPUTER READABLE MEDIA FOR MEASURING DATA INTEGRITY IN TIME SENSITIVE NETWORKS

(71) Applicant: Keysight Technologies, Inc., Santa Rosa, CA (US)

(72) Inventors: Tanuman Bhaduri, Kolkata (IN); Kingshuk Mandal, Kolkata (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 142 days.

(21) Appl. No.: 17/570,422

(22) Filed: Jan. 7, 2022

(65) Prior Publication Data

US 2023/0224079 A1    Jul. 13, 2023

(51) Int. Cl.
*H04L 1/00* (2006.01)
*H04L 1/1812* (2023.01)
*H04L 9/40* (2022.01)

(52) U.S. Cl.
CPC .......... *H04L 1/0083* (2013.01); *H04L 1/0061* (2013.01); *H04L 1/1816* (2013.01); *H04L 63/123* (2013.01)

(58) Field of Classification Search
CPC ... H04L 1/0083; H04L 1/0061; H04L 1/1816; H04L 63/123
See application file for complete search history.

(56) References Cited

U.S. PATENT DOCUMENTS

| | | | |
|---|---|---|---|
| 7,249,306 B2* | 7/2007 | Chen | H03M 13/091 714/758 |
| 9,313,140 B2 | 4/2016 | Matthews et al. | |
| 9,455,905 B2 | 9/2016 | Thaler et al. | |
| 2002/0087716 A1* | 7/2002 | Mustafa | H04L 49/90 709/236 |
| 2007/0226580 A1* | 9/2007 | King | H04L 1/005 714/758 |
| 2013/0016724 A1* | 1/2013 | Thaler | H04L 47/245 370/393 |
| 2014/0245114 A1* | 8/2014 | Thaler | H04L 1/0083 370/389 |
| 2018/0309655 A1 | 10/2018 | Joseph et al. | |
| 2020/0136953 A1* | 4/2020 | Datta | H04L 47/245 |
| 2020/0153722 A1 | 5/2020 | Datta et al. | |

(Continued)

OTHER PUBLICATIONS

Kovacevic et al., "Towards Implementation of Frame Preemption Mechanism on FPGA Platform," 19th International Symposium INFOTEH-JAHORIA, pp. 1-7 (Mar. 18-20, 2020).

*Primary Examiner* — Cynthia Britt
*Assistant Examiner* — Rong Tang

(57) ABSTRACT

Methods, systems, and computer readable media for measuring data integrity in time sensitive networks. An example method for testing a time sensitive network (TSN) device includes calculating a data integrity value for a preemptable frame. The method includes appending the data integrity value to an end of the preemptable frame and transmitting the preemptable frame to the TSN device, causing the TSN device to fragment the preemptable frame or to reassemble the preemptable frame after fragmentation. The method includes receiving the preemptable frame after traversing the TSN device and validating the data integrity value of the preemptable frame after traversing the TSN device.

9 Claims, 5 Drawing Sheets

(56) References Cited

U.S. PATENT DOCUMENTS

| | | |
|---|---|---|
| 2020/0244382 A1 | 7/2020 | Regev |
| 2020/0252424 A1 | 8/2020 | Regev |
| 2021/0226843 A1 | 7/2021 | Bhaduri |
| 2022/0179997 A1* | 6/2022 | Branscomb ........... H04L 63/162 |
| 2023/0086197 A1* | 3/2023 | De ........................ H04L 43/106 |
| | | 709/224 |

* cited by examiner

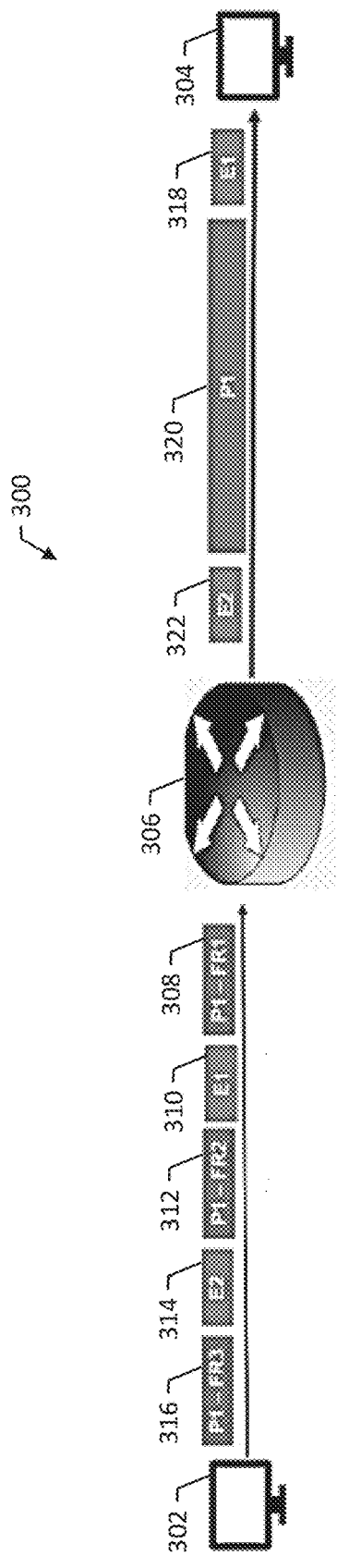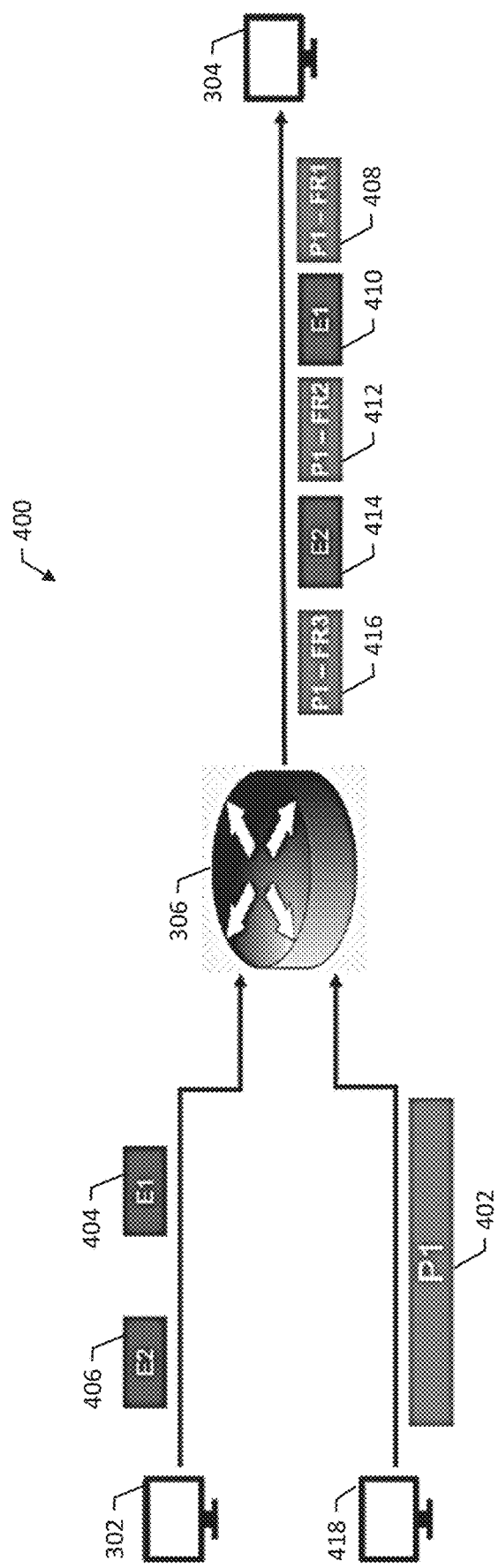

METHODS, SYSTEMS, AND COMPUTER READABLE MEDIA FOR MEASURING DATA INTEGRITY IN TIME SENSITIVE NETWORKS

TECHNICAL FIELD

The subject matter described herein relates to network testing. More specifically, the subject matter relates to methods, systems, and computer readable media for measuring data integrity in time sensitive networks.

BACKGROUND

Ethernet can be extended to Industrial networks where machines and sensors communicate among themselves to take some action collectively. The communication demands deterministic delivery of information with ultra-low latency bounds. To cater to the stringent needs of industrial networks, ethernet needs to overcome some of its weaknesses.

Time Sensitive Networking (TSN) comes with a promise of overcoming the drawbacks of traditional ethernet networks by ensuring time synchronization and guaranteed low latency bounds for data transmission. Frame pre-emption is one such TSN standard which is being adopted across various TSN-enabled ecosystems. Pre-emption introduces the concept of fragmentation and reassembly of ethernet frames. This is a significant shift from traditional ethernet paradigm. With introduction of frame pre-emption, the traditional methodology to measure the data integrity of ethernet frame transmission falls short.

Accordingly, a need exists for methods, systems, and computer readable media for measuring data integrity in time sensitive networks.

SUMMARY

Methods, systems, and computer readable media for measuring data integrity in time sensitive networks. An example method for testing a time sensitive network (TSN) device includes calculating a data integrity value for a preemptable frame. The method includes appending the data integrity value to an end of the preemptable frame and transmitting the preemptable frame to the TSN device, causing the TSN device to fragment the preemptable frame or to reassemble the preemptable frame after fragmentation. The method includes receiving the preemptable frame after traversing the TSN device and validating the data integrity value of the preemptable frame after traversing the TSN device.

An example system for testing a time sensitive network (TSN) device includes a first test station comprising at least a first processor and configured for calculating a data integrity value for a preemptable frame; appending the data integrity value to an end of the preemptable frame; and transmitting the preemptable frame to the TSN device, causing the TSN device to fragment the preemptable frame or to reassemble the preemptable frame after fragmentation. The system includes a second test station configured for receiving the preemptable frame after traversing the TSN device and validating the data integrity value of the preemptable frame after traversing the TSN device.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which:

FIG. 3 is a block diagram illustrating frame reassembly;

FIG. 4 is a block diagram illustrating frame fragmentation;

DETAILED DESCRIPTION

Conventional ethernet is typically best effort service, so that a packet originated from an ingress node reaches its destination in a best effort manner. In "best effort manner" the packet may reach the destination, but it can be difficult to predict how much time the packet will take to reach the destination or it may not reach at all. The reason for this unpredictability is that the outgoing queue of a switch might be full already. So additional incoming packets may get queued or may get dropped or may get delayed.

An outgoing port of a typical ethernet switch can transmit only one packet at a time. If the currently transmitting packet is a long one (say a packet flow for file back-up), at that point many urgent packets (say a network packet carrying instructions for an industrial robot) will queue-up and if the queue gets full then the urgent packets will get dropped.

Figure 1:
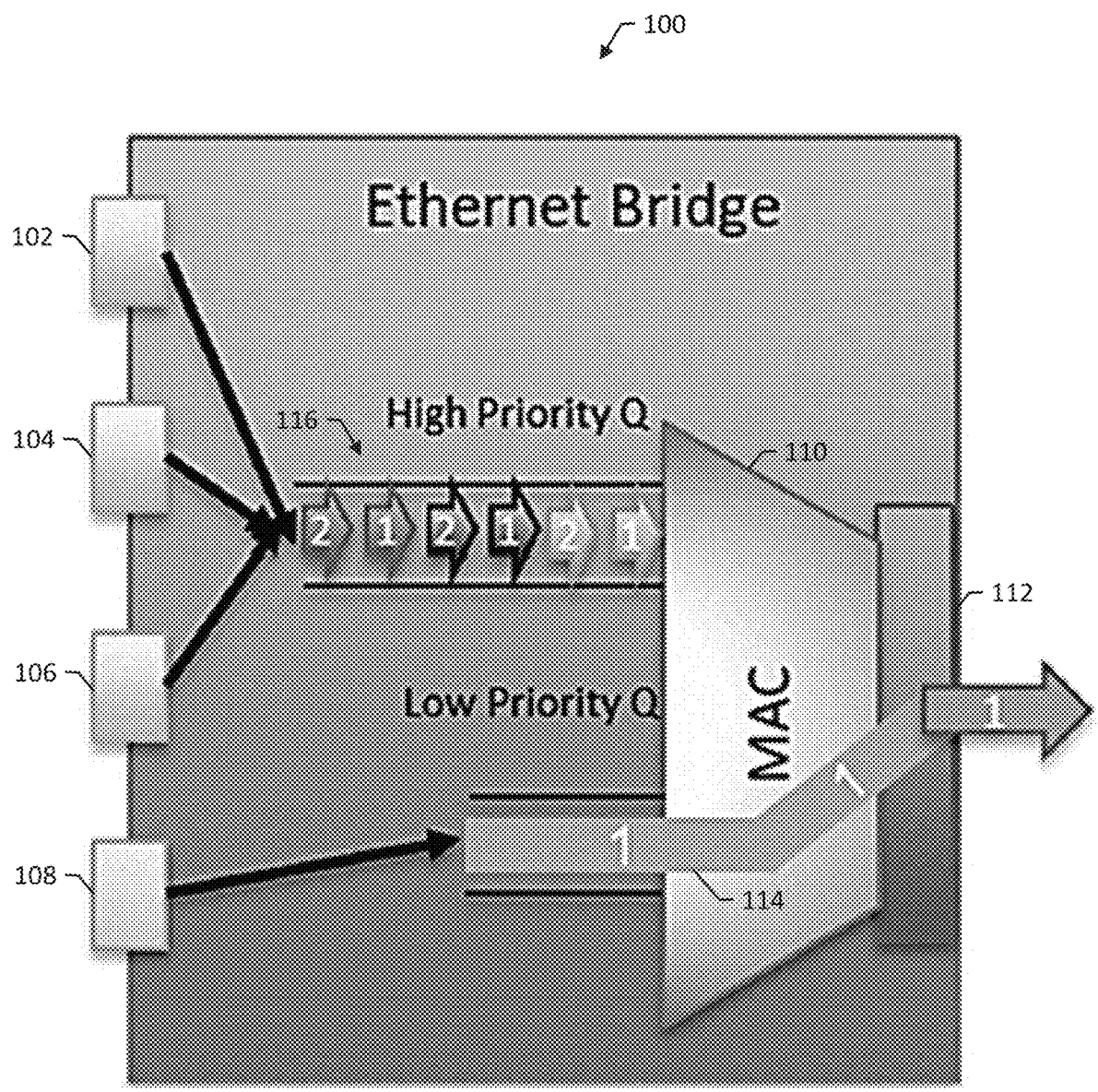
FIG. 1 is a block diagram illustrating an example ethernet bridge.

FIG. 1 is a block diagram illustrating an example ethernet bridge 100. The bridge 100 includes three ports 102, 104, and 106 for urgent traffic and one port 108 for non-critical traffic. Traffic passes through the media access control (MAC) layer 110 and then is transmitted on an egress port 112. As shown in FIG. 1, a large non-critical packet 114 delays transmission of other urgent traffic 116. The delay potentially prevents the bridge 100 from meeting urgent timing requirements for the urgent traffic 116.

To overcome this problem, time sensitive network standards, e.g., the IEEE 802.1 time sensitive networking (TSN)

standards, introduced frame pre-emption technology. In a frame-preemption capable switch, the non-critical frame can be stopped in the middle of transmission. The urgent frames will be transmitted and then the rest of the non-urgent frame will resume transmission. So when frame pre-emption is implemented, fragmented ethernet frames will traverse the connection intermixed with urgent frames.

Figure 2:
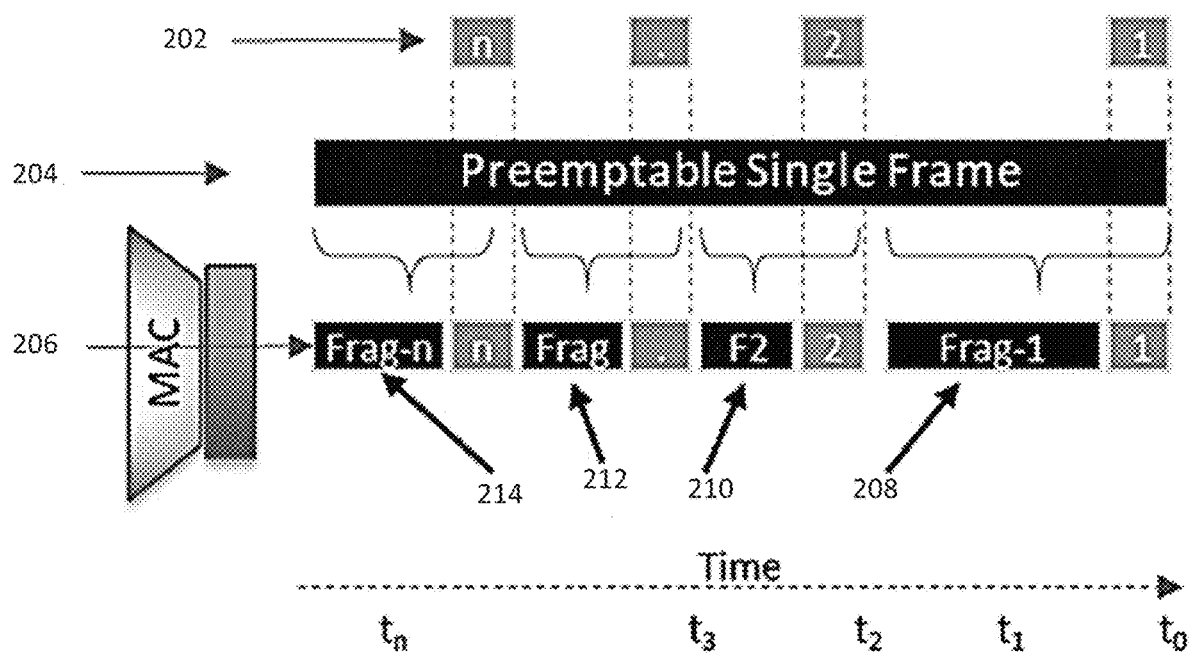
FIG. 2 is a message diagram illustrating an example preemptable frame being fragmented to accommodate express traffic.

FIG. 2 is a message diagram illustrating an example preemptable frame being fragmented to accommodate express traffic. FIG. 2 shows express traffic 202 and a preemptable frame 204 both arriving at an ethernet bridge over a period of time and being intermixed in the wire 206. The bridge fragments the preemptable frame 204 into fragments 208, 210, 212, and 214, which are transmitted between packets of the express traffic 202.

Frame preemption is based on two major concepts: frame reassembly and frame fragmentation.

FIG. 3 is a block diagram illustrating frame reassembly. Multiple preempted fragments get reassembled into a complete ethernet frame at an ingress port of a device.

FIG. 3 shows a system 300 including a first test station 302, a second test station 304, and a device under test (DUT) 306. The DUT 306 is configured to be compliant with a time sensitive networking standard such that DUT 306 is configured for frame fragmentation and frame reassembly.

Each of the test stations 302 and 304 is a computer system configured for executing test scripts for testing DUT 306, e.g., to verify successful frame fragmentation and frame reassembly. For example, the first test station 302 can be programmed for generating traffic, and the second test station 304 can be programmed for receiving traffic and determining a test result for the DUT 306 based on whether the received traffic meets a test expectation.

As shown in FIG. 3, the first test station 302 is generating interspersed preempted fragments 308, 312, and 316 and express frames 310 and 312. The first station 302 may be executing a test script specifying interspersed packets for the purpose of testing the DUT 306 for appropriate frame reassembly. The fragments 308, 312, and 216 are getting reassembled at the ingress port of the DUT 306 and then the DUT 306 forwards the reassembled frame 320 and the express frames 318 and 322 to the second test station 304.

FIG. 4 is a block diagram illustrating frame fragmentation. An ethernet frame in transit is broken into fragments at an egress port of a device due to presence of higher priority traffic.

FIG. 4 shows the first test station 302, the second test station 304, a third test station 418, and the DUT 306. The first test station 302 generates express traffic, i.e., time critical traffic in the network, and carries highest priority for frame delivery. The third test station 418 generates preemptible traffic which carries lesser priority compared to express traffic. The DUT 306 can determine a priority level for incoming traffic using any appropriate technique. For example, the DUT 306 can identify a priority level based on incoming ports, such that all traffic on a first port is express traffic and all traffic on a second port is preemptable traffic.

At an ingress port of the DUT 306, the preemptible traffic gets fragmented when a preemptible frame is found in transit and an express frame arrives at the same point in time. At the second test station 304, the fragments of preemptible traffic are received and then reassembled.

As shown in the example of FIG. 4, the third test station 418 is transmits a preemptable frame 402 to DUT 306, while the first test station 302 transmits to DUT 306 a first express packet 404 followed by a second express packet 406.

The DUT 306 first transmits a first fragment 408 of the preemptable frame 402, which is then interrupted by the first express packet 404. The DUT 306 transmits the first express packet 410. Then the DUT 306 resumes transmitting the preemptable frame 402 by transmitting a second fragment 412 of the preemptable frame 402, which is then interrupted by the second express packet 406.

The DUT 306 transmits the second express packet 414. Then the DUT 306 resumes transmitting the preemptable frame 402 by transmitting a third fragment 416 of the preemptable frame 402, which completes transmission of the preemptable frame 402. The second test station 304 can then reassemble the fragments 408, 412, and 416 to form the received preemptable frame.

Both fragmentation and reassembly have their own computing overheads which need to be managed by any device implementing frame preemption. For example, fragmentation includes overheads like breaking an ethernet frame into fragments, inserting preambles, calculating partial cyclical redundancy checks (also called mCRC) for each of the fragments and then transmitting them.

Similarly, reassembly includes methods like reconstructing the frame altogether by removing individual mCRC's from the fragments along with intermediate preambles and then recomputing the CRC of the whole frame. While the device is busy performing all the above functions, it also needs to strictly take care of the fact that there cannot be any changes getting introduced into frame payload due to either fragmentation or reassembly of an ethernet frame.

Changes in frame payload would mean that that the necessary information that the frame was carrying gets partially of fully lost in transit. Such anomalies need to be thoroughly validated for a preemption implementation inside a device.

Maintaining integrity of the data being transmitted through an ethernet frame needs to be ensured by each device participating in a preemption capable network. A basic way of checking data integrity is to validate the CRC checksum which every device inserts at the end of the frame while the frame gets transmitted. This is what is mandated by the 802.3 ethernet standard as well.

But this mechanism is not good enough for measuring accurately if the device under test is changing the ethernet payload or not. This is because the CRC checksum of ethernet frames gets recalculated by intermediate nodes in a network and then reinserted into the frame as last four trailing bytes.

Consider a scenario where a DUT receives a fragmented frame from its neighboring hop, and, while reassembling, the DUT alters few bytes of the reconstructed ethernet frame due to an anomalous implementation of preemption. The DUT will recalculate the CRC checksum again on the whole reconstructed payload and re-insert it as last four bytes of the frame and forward it to the next hop. Once the frame is received at the next hop, the receiver will run a CRC checksum on the received frame (the payload is already altered by the DUT) and match its computed CRC with the one present in the frame.

The checksum will match with the one present in the frame and the payload alteration will go unnoticed. This is an issue which should be thoroughly validated. The systems and methods described in this document are configured for solving these measurement problems for frame preemption by appending a data integrity value to some outgoing frames during DUT testing.

Figure 5:
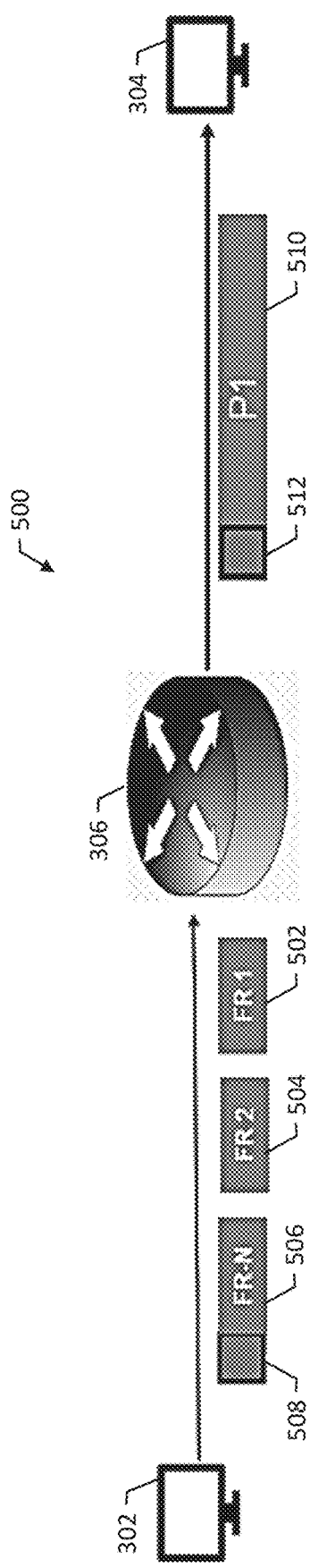
FIG. 5 illustrates using a data integrity value to test frame reassembly.

FIG. 5 illustrates using a data integrity value to test frame reassembly. In this scenario, data integrity will be measured when the DUT receives pre-empted fragments and then reassembles and forwards the whole frame. The challenge is in the fact that traditional validation of integrity is not sufficient as the DUT can alter the parts of the payload and recalculate the CRC checksum, hence the change in payload will go unnoticed.

As shown in FIG. 5, the first test station 302 generates pre-empted fragments 502, 504, and 506 which the DUT 306 reassembles and then forwards a whole reassembled frame 510 to the receiver test station 304. Both test stations 302 and 304 are part of the same test system hence they share information with respect to frame transmission like frame size, frame header etc. To measure the data integrity of a reassembled whole frame 510, the test system can use a data integrity value 508 that is appended to the frame in addition to any other checksums specified by the networking protocols in use, e.g., CRCs.

The first test station 302 inserts a separate data integrity checksum 508 "C1" (for example) into the last 64 bytes of the last generated fragment of a preemptible frame. If we assume that a preemptible whole frame was fragmented into three parts, then the data integrity checksum is first calculated on the frame before fragmentation and then the test tool inserts it into the last fragment.

The data integrity checksum should not be confused with the CRC; the CRC is calculated as mandated by ethernet standard. Any appropriate method for calculating the data integrity checksum can be used; as an example, an algorithm like the MD5 checksum or any other effective candidates can be used here. In summary, the test system inserts the data integrity checksum of the whole preemptible frame into the last 64 bytes of the last fragment.

The DUT 306 receives all the fragments 502, 504, and 506, reassembles them, and then forwards the reassembled frame 510 to the second test station 304. Upon receiving the whole reassembled frame 510, the second test station 304 recalculates the data integrity checksum on the whole frame again using the same algorithm to generate the initial data integrity checksum 508; this recalculated checksum can be referred to as "C2".

The checksum value "C1" is fetched from the payload 512 of the reassembled frame 510 (this is possible as the first and second test stations 302 and 304 are part of them same test system) and then "C1" and "C2" are compared. If C1 and C2 match with each other then there is no error that has taken place and the data integrity check has passed. If the DUT 306 indeed changes part of the payload then recalculated checksum will not match with the one inserted into the frame and the integrity check will fail.

Figure 6:
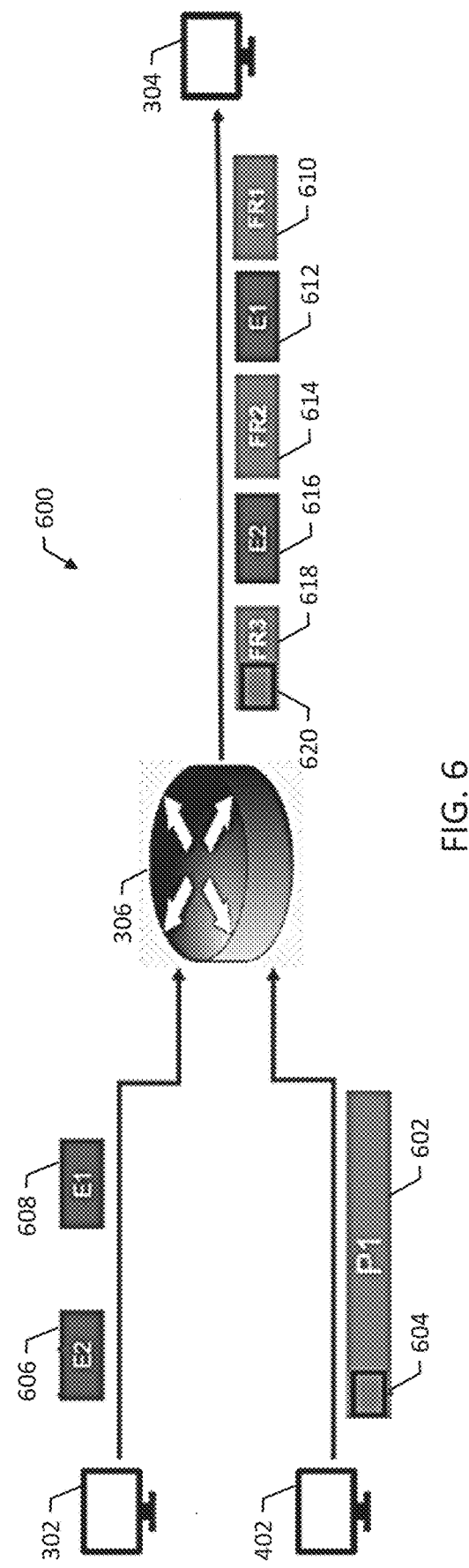
FIG. 6 illustrates using a data integrity value to test frame fragmentation.

FIG. 6 illustrates using a data integrity value to test frame fragmentation. In this scenario, data integrity will be measured when the DUT 306 fragments a preemptible frame 602 in presence of express frames 606 and 608.

In this diagram, the first test station 302 generates express frames 606 and 608 and the third test station 402 generates a preemptable frame 602. The DUT 306 fragments the preemptible frame 602 at its egress port if it receives an express frame while a preemptible frame is already under transmission.

The second test station 304 receives the fragments 610, 614, and 618 along with the express frames 612 and 614. The test stations 302, 304, and 402 are part of the same test system hence they can be configured to share information with respect to frame transmission like frame size, frame header etc.

The third test station 402 inserts a separate data integrity checksum 604 "C1" (for example) into the last 64 bytes of a preemptible frame. As per specification 802.3br (Specification and Management Parameters for Interspersing Express Traffic) the minimum size of a fragment is 64 bytes, hence inserting the checksum at last 64 bytes of a preemptible frame ensures that the information will never get further fragmented and the block of information will be intact. Any appropriate method for calculating the data integrity checksum can be used. In summary, the data integrity checksum of the whole preemptible frame is inserted into the last 64 bytes of the frame itself.

The DUT 306 fragments the preemptible frame 602 and then forwards the fragments 610, 614, and 618, along with interspersed express frames 612 and 616, to the second test station 304. Upon receiving the fragments 610, 614, and 618 of the preemptible frame, the second test station 304 reassembles the fragments and constructs the preemptible whole frame.

The second test station 304 then recalculates the data integrity checksum on the whole frame again using the same algorithm used to generate the data integrity checksum on the outgoing frame 602; this recalculated checksum can be called "C2". The checksum value "C1" is fetched from the payload 620 of the reassembled frame (this is possible as all test stations 302, 304, and 402 are part of them same test system) and then "C1" and "C2" are compared.

If C1 and C2 match with each other then there is no error that has taken place and data integrity check has passed. If the DUT 306 changes part of the payload while it was fragmenting the frame 602 then the recalculated checksum will not match with the one inserted into the frame and the integrity check will fail.

The use of the data integrity checksums illustrated in FIGS. 5 and 6 can produce one or more of the following advantages:

Prevention of re-fragmentation by the DUT. Even if the DUT re-fragments the frame in an entirely different way, the test system will receive the data integrity checksum of the whole frame carried in the last fragment only. Re-fragmentation will not able to change this behaviour.

The test will work without making any assumption on how many fragments the test system may receive on the egress side or receive side.

The method for computing integrity checksums can protect time sensitive network systems from anomalous implementation of frame preemption within switches.

Figure 7:
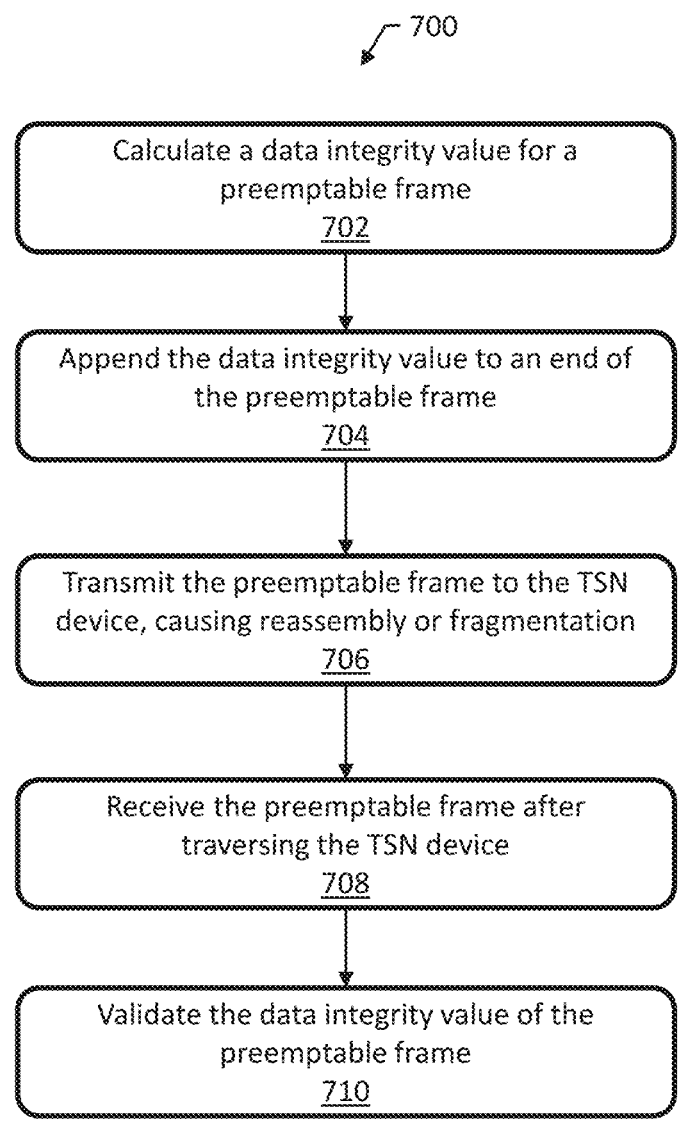
FIG. 7 is a flow diagram of an example method for testing a time sensitive networking device.

FIG. 7 is a flow diagram of an example method 700 for testing a time sensitive networking device. The device can be any type of device that processes or routes packets in a time sensitive network. For example, the device can be an ethernet bridge such as the example ethernet bridge 100 shown in FIG. 1.

The method 700 can be performed by a test system including at least one processor and memory storing instructions for the processor(s). The test system can include, for example, multiple test stations as depicted in FIGS. 3-6. The test system can perform the method 700 as part of executing a test script to test the device or test a network including the device.

The method 700 includes calculating a data integrity value for a preemptable frame (702). Calculating the data integrity value can include calculating a checksum of the preemptable frame. The data integrity value can have a size equal to a minimum size of a frame fragment for a time sensitive network.

The method 700 includes appending the data integrity value to an end of the preemptable frame (704). The method

700 can include appending the data integrity value in addition to a cyclical redundancy check (CRC) value in accordance with a standards requirement for a time sensitive network.

The method 700 includes transmitting the preemptable frame to the TSN device, causing the TSN device to fragment the preemptable frame or to reassemble the preemptable frame after fragmentation (706). In some examples, transmitting the preemptable frame to the TSN device includes fragmenting the preemptable frame to the TSN device, causing the TSN device to reassemble the preemptable frame after fragmentation, and receiving the preemptable frame after traversing the TSN device comprises receiving a reassembled frame, e.g., as illustrated in FIG. 5.

In some other examples, transmitting the preemptable frame to the TSN device causes the TSN device to fragment the preemptable frame while retransmitting the preemptable frame to accommodate express traffic at the TSN device, and receiving the preemptable frame after traversing the TSN device includes receiving fragments of the preemptable frame and reassembling the preemptable frame from the plurality of fragments, e.g., as illustrated in FIG. 6. Then, the method 700 can include transmitting the express traffic to the TSN device and thereby causing the TSN device to fragment the preemptable frame.

The method 700 includes receiving the preemptable frame after traversing the TSN device (708). The method 700 includes validating the data integrity value of the preemptable frame after traversing the TSN device (710). For example, the data integrity value can be recomputed from the preemptable frame (the entire contents, not including the data integrity value itself) and then compared to the data integrity value appended to the received preemptable frame. If the recomputed data integrity value matches the received data integrity value, then the test system can determine that the device was successful in fragmenting or reassembling the preemptable frame.

The method 700 can include outputting a result of validating the data integrity value. For example, outputting a result can include displaying a pass/fail message on a display device or transmitting a test results report to a remote computer system.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A system for testing a time sensitive network (TSN) device under test, the system comprising:
    a first test station comprising at least a first processor and configured for:
        generating a plurality of fragments of a preemptable frame;
        calculating, using an algorithm, a first data integrity value for the preemptable frame, wherein the data integrity value is based on an entirety of the preemptable frame;
        appending the first data integrity value to a last fragment of the fragments of the preemptable frame, wherein appending the first data integrity value comprises appending the first data integrity value in addition to a cyclical redundancy check (CRC) value in accordance with a standards requirement for a time sensitive network;
        transmitting the fragments of the preemptable frame to the TSN device under test, causing the TSN device under test or to reassemble the preemptable frame after fragmentation and transmit the reassembled preemptable frame; and
    a second test station comprising at least a second processor and configured for:
        receiving, from the TSN device under test, the reassembled preemptable frame; and
        validating frame reassembly functionality of the TSN device under test by validating the first data integrity value of the preemptable frame, wherein validating the first data integrity value of the preemptable frame includes fetching the first data integrity value from a payload of the reassembled preemptable frame, calculating a second data integrity value using the same algorithm using to calculate the first data integrity value, and comparing the first and second data integrity values.

2. The system of claim 1, wherein the first data integrity value has a size equal to a minimum size of a frame fragment for a time sensitive network.

3. The system of claim 1, wherein calculating the first data integrity value comprises calculating a checksum of the preemptable frame.

4. A method for testing a time sensitive network (TSN) device under test, the method comprising:
    generating a plurality of fragments of a preemptable frame;
    calculating, using an algorithm, a first data integrity value for the preemptable frame, wherein the first data integrity value is based on an entirety of the preemptable frame;
    appending the first data integrity value to a last fragment of the fragments of the preemptable frame, wherein appending the data integrity value comprises appending the first data integrity value in addition to a cyclical redundancy check (CRC) value in accordance with a standards requirement for a time sensitive network;
    transmitting fragments of the preemptable frame to the TSN device under test, causing the TSN device under test to reassemble the preemptable frame after fragmentation and transmit the reassembled preemptable frame;
    receiving, from the TSN device under test, the reassembled preemptable frame; and
    validating frame reassembly functionality of the TSN device under test by validating the first data integrity value of the preemptable frame, wherein validating the first data integrity value of the preemptable frame includes fetching the first data integrity value from a payload of the reassembled preemptable frame, calculating a second data integrity value using the same algorithm using to calculate the first data integrity value, and comparing the first and second data integrity values.

5. The method of claim 4, wherein the first data integrity value has a size equal to a minimum size of a frame fragment for a time sensitive network.

6. The method of claim 4, wherein calculating the first data integrity value comprises calculating a checksum of the preemptable frame.

7. A non-transitory computer readable medium comprising computer executable instructions embodied in the non-transitory computer readable medium that when executed by at least one processor of at least one computer cause the at least one computer to perform steps comprising:

generating a plurality of fragments of a preemptable frame;

calculating, using an algorithm, a first data integrity value for the preemptable frame, wherein the first data integrity value is based on an entirety of the preemptable frame;

appending the first data integrity value to a last fragment of the fragments of the preemptable frame, wherein appending the first data integrity value comprises appending the first data integrity value in addition to a cyclical redundancy check (CRC) value in accordance with a standards requirement for a time sensitive network;

transmitting the fragments of the preemptable frame to a time sensitive network (TSN) device under test, causing the TSN device under test to reassemble the preemptable frame after fragmentation;

receiving, from the TSN device under test, the reassembled preemptable frame; and validating frame reassembly functionality of the TSN device under test by validating the first data integrity value of the preemptable frame, wherein validating the first data integrity value of the preemptable frame includes fetching the first data integrity value from a payload of the reassembled frame, calculating a second data integrity value using the same algorithm using to calculate the first data integrity value, and comparing the first and second data integrity values.

8. The non-transitory computer readable medium of claim 7, wherein the first data integrity value has a size equal to a minimum size of a frame fragment for a time sensitive network.

9. The non-transitory computer readable medium of claim 7, wherein calculating the first data integrity value comprises calculating a checksum of the preemptable frame.

* * * * *

UNITED STATES PATENT AND TRADEMARK OFFICE
CERTIFICATE OF CORRECTION

PATENT NO. : 12,177,017 B2
APPLICATION NO. : 17/570422
DATED : December 24, 2024
INVENTOR(S) : Bhaduri et al.

Page 1 of 1

It is certified that error appears in the above-identified patent and that said Letters Patent is hereby corrected as shown below:

In the Claims

Column 8, Claim 1, Line 17, replace "using" with "used".

Column 8, Claim 4, Line 54, replace "using" with "used".

Column 10, Claim 7, Line 7, replace "using" with "used".

Signed and Sealed this
Eleventh Day of February, 2025

Coke Morgan Stewart
*Acting Director of the United States Patent and Trademark Office*